(12) United States Patent
Kuehne

(10) Patent No.: US 11,922,585 B2
(45) Date of Patent: Mar. 5, 2024

(54) METHOD FOR OPERATING A HEAD-MOUNTED DISPLAY APPARATUS IN A MOTOR VEHICLE, CONTROL DEVICE, AND HEAD-MOUNTED DISPLAY APPARATUS

(71) Applicant: AUDI AG, Ingolstadt (DE)

(72) Inventor: Marcus Kuehne, Beilngries (DE)

(73) Assignee: AUDI AG, Ingolstadt (DE)

( * ) Notice: Subject to any disclaimer, the term of this patent is extended or adjusted under 35 U.S.C. 154(b) by 70 days.

(21) Appl. No.: 17/641,273

(22) PCT Filed: Aug. 11, 2020

(86) PCT No.: PCT/EP2020/072503
§ 371 (c)(1),
(2) Date: Mar. 8, 2022

(87) PCT Pub. No.: WO2021/047845
PCT Pub. Date: Mar. 18, 2021

(65) Prior Publication Data
US 2022/0319122 A1 Oct. 6, 2022

(30) Foreign Application Priority Data
Sep. 10, 2019 (DE) .................. 10 2019 213 740.7

(51) Int. Cl.
*G06T 19/00* (2011.01)
*B60R 1/29* (2022.01)
(Continued)

(52) U.S. Cl.
CPC .............. *G06T 19/006* (2013.01); *B60R 1/29* (2022.01); *G06F 3/011* (2013.01); *G10L 25/51* (2013.01);
(Continued)

(58) Field of Classification Search
CPC ..... G06T 19/006; B60R 1/29; B60R 2300/20; B60R 2300/304; B60R 2300/8006;
(Continued)

(56) References Cited

U.S. PATENT DOCUMENTS

2003/0210228 A1* 11/2003 Ebersole .................. G06F 3/012
345/157
2018/0144549 A1* 5/2018 Gonzalez ........... G02B 27/0101
(Continued)

FOREIGN PATENT DOCUMENTS

DE       10 2009 049 073 A1    4/2011
DE       102012218837 A1 *   6/2014    ........... G02B 27/017
(Continued)

OTHER PUBLICATIONS

International Search Report for International Application No. PCT/EP2020/072503 dated Oct. 26, 2020.
(Continued)

*Primary Examiner* — Ryan R Yang
(74) *Attorney, Agent, or Firm* — STAAS & HALSEY LLP

(57) ABSTRACT

A control device in a motor vehicle receives a signal from a sensor device which includes at least one image of the current interior situation. The control device generates a superimposition signal containing the at least one image of the current interior situation and transmits the superimposition signal to a display element of a display apparatus. The display apparatus superimposes the at least one image of the current interior situation onto predefined output content output to a user.

20 Claims, 1 Drawing Sheet

(51) Int. Cl.
*G06F 3/01* (2006.01)
*G10L 25/51* (2013.01)
*G10L 25/78* (2013.01)

(52) U.S. Cl.
CPC .......... *G10L 25/78* (2013.01); *B60R 2300/20* (2013.01); *B60R 2300/304* (2013.01); *B60R 2300/8006* (2013.01)

(58) Field of Classification Search
CPC ..... B60R 2300/00; G06F 3/011; G10L 25/51; G10L 25/78; G02B 2027/0141; G02B 27/017
See application file for complete search history.

(56) References Cited

U.S. PATENT DOCUMENTS

| | | | | |
|---|---|---|---|---|
| 2019/0171024 A1* | 6/2019 | Tümler | ................... | G06F 3/012 |
| 2020/0066040 A1* | 2/2020 | Unnerstall | ........... | G06Q 20/102 |
| 2021/0375059 A1* | 12/2021 | Kuehne | ............. | G02B 27/0172 |

FOREIGN PATENT DOCUMENTS

| | | | | |
|---|---|---|---|---|
| DE | 10 2014 001 274 A1 | 8/2015 | | |
| DE | 10 2014 010 309 A1 | 1/2016 | | |
| DE | 10 2014 213 285 A1 | 1/2016 | | |
| DE | 10 2014 018 054 A1 | 6/2016 | | |
| DE | 10 2015 003 882 A1 | 9/2016 | | |
| DE | 10 2016 120 425 A1 | 4/2017 | | |
| DE | 10 2017 211 520 A1 | 1/2019 | | |
| DE | 10 2019 213 740.7 | 9/2019 | | |
| KR | 20190103094 A * | 9/2019 | ......... | G02B 27/0093 |
| WO | WO 2017020132 A1 * | 2/2017 | ........... | G06T 19/006 |
| WO | WO 2019044536 A1 * | 3/2019 | ............. | H04N 23/67 |
| WO | PCT/EP2020/072503 | 8/2020 | | |

OTHER PUBLICATIONS

Office Action for German Application No. 10 2019 213 740.7 dated Aug. 8, 2020.
Translation by WIPO of International Preliminary Report on Patentability for PCT/EP2020/072503, dated Mar. 15, 2022, 7 pp.

* cited by examiner

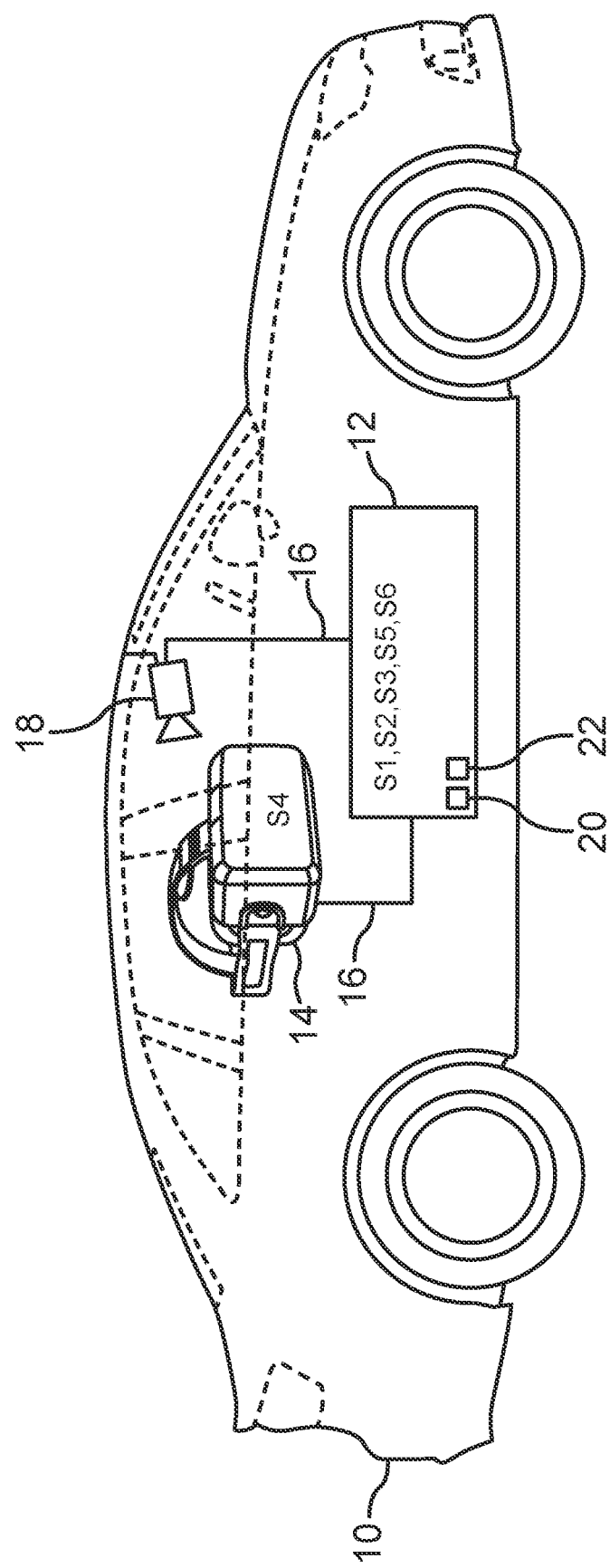

METHOD FOR OPERATING A HEAD-MOUNTED DISPLAY APPARATUS IN A MOTOR VEHICLE, CONTROL DEVICE, AND HEAD-MOUNTED DISPLAY APPARATUS

CROSS REFERENCE TO RELATED APPLICATIONS

This application is a U.S. national stage of International Application No. PCT/EP2020/072503, filed on Aug. 11, 2020. The International Application claims the priority benefit of German Application No. 10 2019 213 740.7 filed on Sep. 10, 2019. Both the International Application and the German Application are incorporated by reference herein in their entirety.

BACKGROUND

Described below is a method for operating a head-mounted display device in a motor vehicle.

With the advance of the development of autonomously driving motor vehicles, head-mounted output devices have become increasingly important for entertainment during a journey and also for the currently growing development of driving services. The use of immersive on-board entertainment in particular for example in ride-hailing vehicles is faced with the challenge that the user can no longer be aware of the situation in the vehicle when wearing, for example, VR glasses. While this is not an issue in normal passenger entertainment, this may very well become a problem for example in a ride-hailing vehicle, where the user possibly wishes to be fully aware of the situation so as to feel more at ease and safe.

While immersing into a virtual reality ("VR") in such a vehicle, for example, the user for example no longer has awareness of what the driver does or what other passengers, who are typically strangers, do. It is not possible to see if, for example, the unfamiliar driver wishes to speak to the passenger and if the driver is looking at the passenger. If the driver addresses the passenger, this can only be perceived if the display device leaves the ears uncovered and the display device has no earphones for a sound experience of an entertainment program. If the passenger for example is also unable to acoustically perceive the unfamiliar driver, the only option the driver has is for example to tap the shoulder of the user of the display device or to touch their arm, which could not only be very uncomfortable for the user of the display device, but it might startle the user of the display device.

DE 10 2014 010 309 A1 describes an apparatus having a display unit that is to be worn by the user on the head, which display unit is embodied to completely shield the user's eyes against light with respect to a surrounding area and to stereoscopically display in front of the eyes a virtual object disposed in a virtual space.

DE 10 2009 049 073 A1 discloses a method for presenting virtual information in a view of a real surrounding area.

DE 10 2014 213 285 A1 describes a method for displaying contents on smartglasses.

One option for circumventing the problems addressed above is to omit earphones, but this means that the user has no sound for the virtual or partially virtual entertainment program, resulting, for example, in a virtual reality or an augmented reality not being very immersive.

SUMMARY

One aspect of the method is to increase a feeling of safety and the level of comfort in the motor vehicle while using an entertainment offering.

The method is based on the idea of, in addition to the actual output content of an entertainment offering, that is to say in addition to outputting the main content, superposing an image (and/or a captured image series) of the interior of the motor vehicle captured by one or more sensors when using a head-mounted display device in the motor vehicle. The image or the image series is in particular a current image or a current image series. The disadvantages discussed above are significantly reduced or even eliminated. A user of a head-mounted display device feels safe because, despite immersing themselves into for example the virtual reality, they have awareness of the interior of the motor vehicle. Uncomfortable situations in which the user is touched by a stranger without warning can be effectively prevented.

The method for operating a head-mounted display device, for example augmented reality glasses, mixed reality glasses, or virtual reality glasses, while the head-mounted display device is located in an interior of a motor vehicle, is accordingly a method for operating the head-mounted display device in the interior of the motor vehicle. The display device is configured to output a specified output content describing an entertainment offering, for example a computer game or a movie. The output content can be specified for example by the user selecting the output content and thus the entertainment offering or by the output content being specified by a default setting.

The method is performed by a controller, wherein a controller is understood to mean a device or a device component for receiving and evaluating signals and for generating control signals. Accordingly, the method can be referred to as a computer-implemented method for operating the head-mounted display device. The controller can be designed for example as a control chip or a control device. The controller may be a controller of the motor vehicle or of the head-mounted display device.

The controller receives a sensor signal from a sensor device, wherein the received sensor signal describes at least one image of the current interior situation of the motor vehicle. A sensor device is understood to mean a device or a device group for capturing properties of the environment, in particular for capturing a property of the interior, which is why the sensor device may include, for example, at least one interior camera of the motor vehicle, and/or for example, at least one infrared sensor. The at least one image can be, for example, a photograph, a thermal image, or an image series, for example a film of what is happening in the interior.

The controller generates a superposition signal, which describes the superposition of the at least one image of the current interior situation during the output of the specified output content and transmits the generated superposition signal to a display element of the display device and thereby causes the display device to superpose the at least one image of the current interior situation during the output of the specified output content. A display element is a structural part or structural part group or device component for displaying image contents, for example a screen. In other words, the controller causes the display device to output the at least one image of the interior of the motor vehicle in addition to the output content, for example in addition to a virtual reality, wherein the at least one image of the interior may be output simultaneously with the output content, that is to say the at least one image of the interior is superposed into only a partial region of the visual field of a user of the display device.

This offers the advantages described above.

Optionally, the controller can additionally make available the specified output content. This can be desired for example if the controller is a controller of the motor vehicle and the output content is made available by the motor vehicle for example in the form of a type of entertainment service. However, the controller can optionally make available the specified output content even if the controller is a controller of the display device.

According to an embodiment of the method, the generated superposition signal can describe the superposition of the at least one image of the current interior situation into only a partial region of a visual field of the user of the display device, such as in a primary or central visual field. The user can consequently immediately capture the interior situation.

The received sensor signal can optionally describe at least one camera image of an interior camera of the sensor device. The user can even recognize for example micro gestures and facial expressions of other occupants on this superposed image.

The controller may receive the sensor signal from a sensor device of the motor vehicle. The interior can thereby be recorded from different perspectives, and the method is also compatible with head-mounted display devices that do not possess a corresponding sensor system.

The specified output content can describe for example a virtual reality, in particular a 360-degree virtual reality. This ensures that the user of the display device has a particularly immersive experience during the journey.

According to an embodiment of the method, the controller can generate the superposition signal, or transmit it, only if the controller ascertains that an occupant is speaking, e.g., an occupant other than the user of the display device. It is possible for this purpose, for example, for directional microphones to be installed in the motor vehicle and to be coupled to the controller.

The superposition signal can additionally be generated or transmitted in dependence on the volume of the ascertained speaking voice. Consequently, the user is made aware of the interior exactly when there is a high likelihood that the other person would like to speak to the user of the display device. However, the user possibly continues to hear the sound of the output content but is able to recognize from the superposed image that someone is addressing them right now, and they can decide whether they would like to briefly remove the glasses. Since whatever the other occupant is saying under certain circumstances does not penetrate to the user of the display device in this embodiment of the method, any audio experience is not disturbed.

According to a further embodiment of the method, the controller can generate the superposition signal, or transmit it to the display element of the display device, only if the controller ascertains that the motor vehicle is approaching a destination of the motor vehicle, for example when a distance from the destination falls under a specified threshold value or when specified geographic coordinates are reached. The user is thus "pulled" out of their virtual reality only if a likelihood exists that the driver would soon like to speak to them, for example because of payment for the journey, or that it is likely that the user needs to gather their belongings because they are about to arrive at the destination.

In one variant, the controller can generate the superposition signal, or transmit it to the display element of the display device, only if the controller receives an activation signal from a motor vehicle, for example a signal describing that the hazard warning lights have been switched on. Alternatively, the at least one image of the interior situation can be switched off if the controller receives a deactivation signal from the motor vehicle.

The controller can additionally receive a sensor signal from the sensor device that describes at least one image of an outside area around the motor vehicle, which can be received from an external camera. Either the superposition signal generated by the controller can additionally describe the at least one image of the outside area, or the controller can generate a further superposition signal describing the at least one image of the outside area. The image of the outside area can then for example be superposed at a different location than the image of the interior. The user of the display device therefore additionally has awareness of the surrounding area of the motor vehicle. The sensor device can for this purpose have a camera arranged on an outer skin or on a roof of the motor vehicle.

According to a further embodiment, the controller can generate a map image signal that can describe an image of a navigational map with, for example, the current position of the motor vehicle. This image can be displayed by the display device in addition to the image of the interior situation, and the controller can for this purpose transmit the generated map superposition signal to the display element of the display device.

Alternatively, the map image signal can be output for example only within a specified time period, for example only at the start and/or only at the end of the journey, or only within a specified time period after the start of the journey and before the end of the journey. The interior image can then be displayed only if the image of the navigational map is switched off.

A controller may be configured to implement one or more embodiments of the method. The controller can have a processor device and/or a data memory. A processor device is here understood to mean a device component for electronic data processing, which has at least one microcontroller and/or one microprocessor. A program code for carrying out the method can be stored on the optional data memory. The program code can then be designed to cause, upon execution by the processor device, the controller to carry out one of the above-described embodiments of the method. The controller can then be in the form of a control chip, control device, or application program ("app").

The problem stated above is achieved by a motor vehicle having an embodiment of the controller. The motor vehicle can be a car-like vehicle, in particular a passenger car or truck, or a passenger bus or motorcycle.

The head-mounted display device, also known as a "head-mounted display", is a visual output device that is worn on the head. It is designed and configured to either present images on a screen close to the eyes or to project the images directly onto the retina. The head-mounted display device can be virtual reality glasses, augmented reality glasses, or mixed reality glasses.

The method may be implemented by developments of the controller, the motor vehicle, and the display device, which have features as have already been described in connection with the developments of the method. For this reason, the corresponding developments of the control device, the motor vehicle, and the display device will not be described again.

BRIEF DESCRIPTION OF THE DRAWINGS

These and other aspects and advantages will become more apparent and more readily appreciated from the following description of the exemplary embodiment, taken in conjunction with the accompanying drawing.

The single FIGURE is a schematic illustration of an exemplary embodiment of the method and the apparatuses that perform the method.

DETAILED DESCRIPTION

In the exemplary embodiment, the described components represent individual features that should be considered independently of one another. Therefore, the disclosure is also intended to encompass other combinations of the features than those illustrated. The described embodiment can further also be supplemented by further features already described.

The drawing illustrates the principle of the method and of the apparatuses with reference to a first exemplary embodiment. In this regard, the drawing shows a motor vehicle 10, for example a passenger car of a ride-hailing driving service. In this example, the controller 12 can be, for example, a control device or a control chip of the motor vehicle 10 but can alternatively be installed in the head-mounted display device 14. The head-mounted display device 14 can have for example a screen as the display element (not shown in the drawing).

Communication with the display device 14 takes place via a data communication link 16. For example, if the controller 12 is installed in the display device 14, the data communication link 16 can be a wire-based data communication link, for example a cable or a databus. If the controller 12 is a device component of the motor vehicle 10, the data communication link 16 for communicating between the controller 12 and the display device 14 can likewise be a wire-based data communication link 16, for example a cable, but may be a wireless data communication link 16, for example a WLAN, mobile radio, Internet, or Bluetooth connection. The controller 12 in the drawing has an optional processor device 20 and also an optional data memory 22.

If the controller 12 is a component of the motor vehicle 10, the data communication link 16 to the sensor device 18, which is illustrated in the drawing as an interior camera, can be implemented for example via a databus of the motor vehicle 10, for example a CAN bus.

In the example of the drawing, a user of the exemplary ride-hailing driving service of the motor vehicle 10 can have booked, for example, a journey of ten kilometers or a journey with a driving time of half an hour. The entertainment provided by the head-mounted display device 14 can, for example. constitute an additional service of this driving service. The user can either have brought along their own display device 14, or the display device 14 can be provided by the driving service. For the journey, for example, an entertainment offering that can describe a trip in a virtual reality can be provided during the journey, in particular a 360-degree virtual reality. The output content can be, for example, a Jurassic Park-based virtual reality, that is to say a form of entertainment that describes a virtual trip through a prehistoric landscape.

The output of the specified output content can begin for example at the start of the journey. In S1, the controller 12 receives at least one sensor signal that ideally describes the interior from a plurality of interior cameras of the motor vehicle 10. Although the drawing shows by way of example only one camera of the sensor device 18, it is ideally possible for a plurality of cameras to be arranged such that the interior is filmed, for example, from different perspectives. The images or image series of the individual cameras can then either be described in one sensor signal or in a plurality of sensor signals.

The superposition signal generated in S2 can thus describe a camera image or the camera images of a plurality of interior cameras. After the generated superposition signal has been transmitted (S3) to the display element of the display device 14, the latter is caused to superpose (S4) the corresponding image or the corresponding images into a peripheral visual field of the user. If the controller 12 is a controller 12 of the motor vehicle 10, the generated superposition signal is thus also first transmitted to the display device 14 (S3).

Owing to the superposed image (or owing to the superposed images or image series), the user is able to see for example other, unfamiliar passengers and the unfamiliar driver. If for example the driver wishes to say something to the user, for example if the driver has a question, the user of the display device 14 sees that the driver is turning toward them. Even if the user of the display device 14 additionally receives through the display device 14 audio content from the virtual reality, for example via earphones, the user can recognize that the driver wishes to speak with them. So if the driver initially receives no reply from the user and decides to shake the shoulder of the user of the display device 14, this will not be unexpected for the user and the user of the display device 14 will not be startled. In addition, the user of the display device 14 is able to react much earlier anyway and can prevent the shaking of the shoulder, for example by taking off the display device 14 in order to speak to the driver.

In order to avoid constantly drawing the attention of the user of the display device 14 to the superposed image, but to do so only in specific situations, the controller 12 may generate the superposition signal (S2) or transmit it (S3) only if the controller 12 ascertains (S5), for example by a microphone (not shown in the drawing), that for example the driver has just started to speak. It is optionally possible here for a threshold value for a volume to be additionally stored, to the effect that the image is for example not yet superposed if the driver merely mumbles quietly to themselves.

Alternatively or additionally, the superposition signal can be generated (S2) or the generated superposition signal can be transmitted (S3) only if the controller 12 ascertains (S6), for example on the basis of GPS data or of navigational data ascertained using a navigation device of the motor vehicle 10, that the motor vehicle 10 is moving for example at a distance of only one kilometer from the destination. If the interior signal is superposed only at that time, the user of the display device 14 will know that they are nearly there and for this reason is better able to understand that any agitation they felt in the interior of the motor vehicle 10 is due to the fact that other, unfamiliar passengers are beginning to gather their belongings.

Overall, the examples show how to provide a head-mounted display device 14, such as VR glasses.

In a further example it is possible, for example when using VR glasses in the motor vehicle 10, to superpose (S4) into the exemplary VR environment, in addition to the main content, a (for example generally small) camera image that can communicate the situation in the vehicle interior and possibly also outside the motor vehicle 10 to the VR user, with the result that the latter will always have an awareness of the current situation in and around the motor vehicle 10.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method for operating a head-mounted display device while the head-mounted display device is located in an interior of a motor vehicle and is configured to output specified output content of an entertainment offering, comprising:
    receiving, by a controller, a sensor signal from a sensor device, the sensor signal including at least one image of a current interior situation of the motor vehicle;
    generating, by the controller in response to at least one of the motor vehicle approaching a destination and a volume of a voice of an occupant of the vehicle, a superposition signal instructing superposition of the at least one image of the current interior situation on the specified output content; and
    transmitting the superposition signal from the controller to a display element of the display device, thereby causing the display device to superimpose the at least one image of the current interior situation on the specified output content.

2. The method as claimed in claim 1, wherein the superposition signal instructs the display device to superimpose the at least one image of the current interior situation in only a partial region of a visual field of a user of the display device.

3. The method as claimed in claim 2, wherein the superposition signal instructs the display device to superimpose the at least one image of the current interior situation in one of a primary visual field and a central visual field.

4. The method as claimed in claim 2, wherein the sensor signal provides at least one camera image of an interior camera of the sensor device.

5. The method as claimed in claim 4, wherein the controller receives the sensor signal from the sensor device of the motor vehicle.

6. The method as claimed in claim 4, wherein the specified output content defines a 360-degree virtual reality.

7. The method as claimed in claim 4, further comprising determining, by the controller, that an occupant is speaking, as a prerequisite for said transmitting of the superposition signal.

8. The method as claimed in claim 7, wherein the occupant determined to be speaking is not the user of the display device.

9. The method as claimed in claim 8, wherein said determining is in dependence on the volume of the voice of the occupant.

10. The method as claimed in claim 7,
    further comprising determining, by the controller, whether the motor vehicle is approaching the destination, and
    generating the superposition signal is performed after determining that the motor vehicle approaches the destination.

11. The method as claimed in claim 1, wherein the superposition signal instructs the display device to superimpose the at least one image of the current interior situation in only one of a primary visual field and a central visual field.

12. The method as claimed in claim 1, further comprising determining, by the controller, that an occupant is speaking, as a prerequisite for said transmitting of the superposition signal.

13. The method as claimed in claim 12, wherein the occupant determined to be speaking is not the user of the display device.

14. The method as claimed in claim 13, wherein said determining is in dependence on the volume of the voice of the occupant.

15. A controller in a motor vehicle where a sensor device outputs a sensor signal and a display device displays specified output content of an entertainment offering, said controller comprising:
    a memory; and
    a processor, connected to the memory, configured to
        receive the sensor signal from the sensor device, the sensor signal including at least one image of a current interior situation of the motor vehicle,
        generate, in response to at least one of the motor vehicle approaching a destination and a volume of a voice of an occupant of the vehicle, a superposition signal instructing superposition of the at least one image of the current interior situation on the specified output content, and
        transmit the superposition signal from the controller to the display device, causing the display device to superimpose the at least one image of the current interior situation on the specified output content.

16. The controller as claimed in claim 15, wherein the method further comprises determining that an occupant is speaking, before the superposition signal is transmitted.

17. A motor vehicle, where a display device displays specified output content of an entertainment offering, comprising:
    a sensor device configured to output a sensor signal including at least one image of a current interior situation of the motor vehicle; and
    a controller configured to
        receive the sensor signal from the sensor device,
        generate, in response to at least one of the motor vehicle approaching a destination and a volume of a voice of an occupant of the vehicle, a superposition signal instructing superposition of the at least one image of the current interior situation on the specified output content, and
        transmit the superposition signal from the controller to the display device, causing the display device to superimpose the at least one image of the current interior situation on the specified output content.

18. The motor vehicle as claimed in claim 17, wherein the controller is further configured to
    determine whether the motor vehicle is approaching the destination, and
    generate the superposition signal after determining that the motor vehicle approaches the destination.

19. A head-mounted display device, operated in a motor vehicle having a sensor device configured to output a sensor signal including at least one image of a current interior situation of the motor vehicle; said head-mounted display device comprising:
    a display element; and
    a controller configured to:
        display specified output content of an entertainment offering on the display element,
        receive the sensor signal from the sensor device, generate, in response to at least one of the motor vehicle approaching a destination and a volume of a voice of an occupant of the vehicle, a superposition signal instructing superposition of the at least one image of the current interior situation on the specified output content, and transmit the superposition signal from the controller to the display device, causing the display device to superimpose the at least one image of the current interior situation on the specified output content.

20. The head-mounted display device as claimed in claim 19, wherein the superposition signal instructs the display device to superimpose the at least one image of the current interior situation only in one of a primary visual field and a central visual field, forming less than all of a total visual field of a user of the display device.

* * * * *